No. 814,473. PATENTED MAR. 6, 1906.
J. C. PATTERSON.
TABLE SCREEN.
APPLICATION FILED MAY 16, 1905.
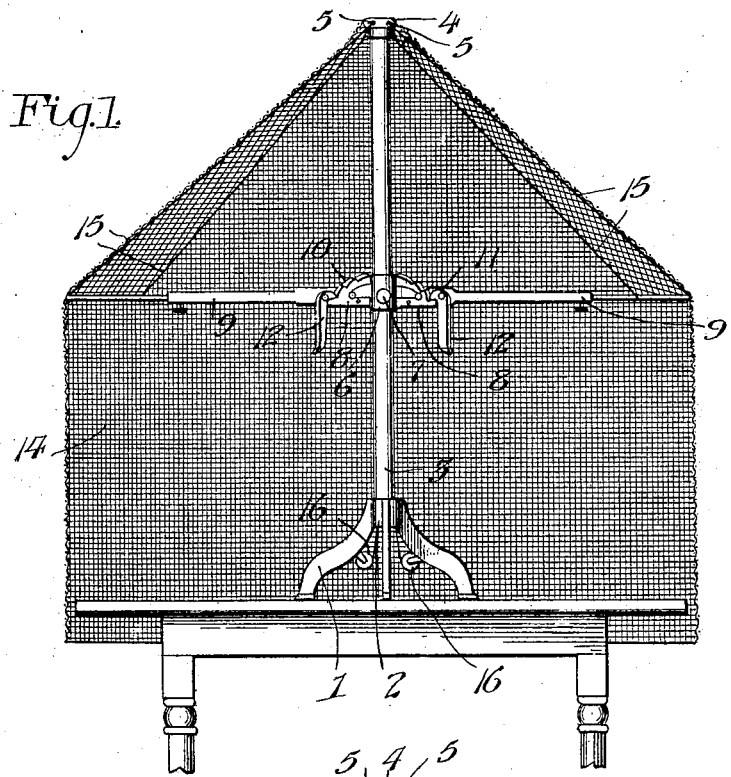
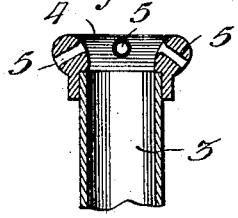
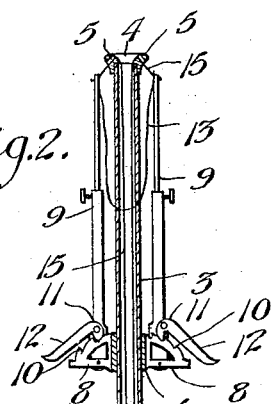
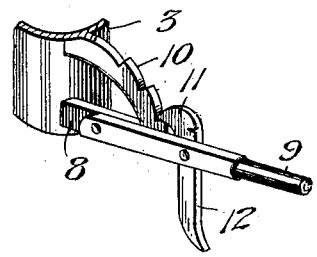
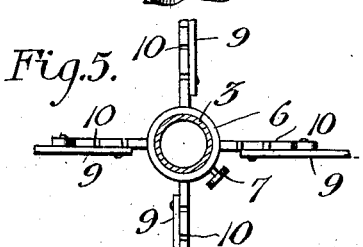
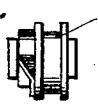
Witnesses
Phil E. Barnes
C. D. Davis
Inventor
Joseph C. Patterson
By R. W. Bishop
Attorney

UNITED STATES PATENT OFFICE.

JOSEPH C. PATTERSON, OF MEADVILLE, PENNSYLVANIA.

TABLE-SCREEN.

No. 814,473.

Specification of Letters Patent.

Patented March 6, 1906.

Application filed May 16, 1905. Serial No. 260,733.

*To all whom it may concern:*

Be it known that I, JOSEPH C. PATTERSON, a citizen of the United States of America, residing at Meadville, in the county of Crawford and State of Pennsylvania, have invented certain new and useful Improvements in Table-Screens, of which the following is such a full, clear, and exact description as will enable others skilled in the art to which it appertains to make and use the same, reference being had to the accompanying drawings, forming a part hereof.

This invention is a screen for use on dining-tables to protect the same against flies and other insects when prepared for a meal; and the invention consists in certain novel features of the device illustrated in the accompanying drawings, as will be hereinafter first fully described and then particularly pointed out in the claims.

In the drawings, Figure 1 is an elevation of the device adjusted for use, the hood or canopy being shown in section. Fig. 2 is a vertical section with the arms raised. Fig. 3 is a detail perspective view of the pivotal connection of the supporting-arms. Fig. 4 is a detail view of the collar at the upper end of the standard. Fig. 5 is a plan view of the adjustable sleeve and radial brackets, the standard being shown in horizontal section; and Fig. 6 is a detail elevation of one of the spring-drums.

The base 1 may be of any convenient form or size and is illustrated as consisting of four legs radiating from a socket or collar 2. In the said socket I secure the lower end of a hollow standard 3, and to the upper end of the said standard I secure a collar or ring 4, having radial openings 5, the upper edges of the said openings being rounded to present smooth convex surfaces. A sleeve 6 is slidably fitted on the standard and is held at any desired point of the same by a set-screw 7, mounted in the sleeve and bearing against the standard, as will be readily understood. Radiating from the sleeve are a series of arms 8, which constitute supporting-brackets for the canopy-carrying arms 9, the said arms being pivoted at their inner ends to the sides of the brackets or arms 8. The upper edges of the brackets 8 are arcs formed with a series of notches 10, and pawls or dogs 11 are pivotally mounted upon the canopy-carrying arms 9 in position to ride upon the upper edges of the brackets 8 and engage the said notches. These pawls 11 are formed with elongated weighted handle portions 12, which project beyond the engaging-point of the pawls and serve to hold them normally in engagement with the notched brackets. They also furnish a convenient means for disengaging the pawls from the brackets. The canopy-carrying arms 9 are preferably of a telescopic formation, so that they may be adjusted to tables of different sizes, and their outer free ends are connected by flexible wires, cords, or similar means 13, which support the outer portions of the hood or canopy 14, while additional cords 15 extend from the ends of the arms to and through the openings 5 in the collar 4 at the upper end of the standard. The said cords then pass down through the standard to spring drums or spools 16, mounted on the under sides of the legs of the base. The hood or canopy is constructed of netting or other light material and is secured at its center to the upper end of the standard. It extends from the standard in all directions to the ends of the arms 9, where it is secured, and its edges depend from the said arms and the connections between the same to the table upon which the device is placed.

The device is placed on the table at the center of the same, so that when the arms are turned outward and downward they will extend to the corners of the table, as will be readily understood. The extent to which the arms are lowered is determined by permitting the pawls 11 to engage the notches 10 at the proper point, and the sleeve may be adjusted to any desired height, so that the canopy may be held over the food in the position desired. In lowering the arms 9 the pawls are held manually out of engagement with the notched brackets, and when allowed to engage the brackets they will hold the arms against further downward movement, so that there will be no danger of the arms dropping against any of the dishes on the table. The adjustment of the sleeve on the standard permits the arms to clear bottles or other tall objects on the table even when lowered to their full extent. When the meal is to be eaten, the arms 9 are swung upward against the standard and will be held in the raised position by the pawls 11 engaging the uppermost notches of the brackets, the pawls riding readily over the brackets as the arms are raised. The spring-drums relieve the labor or strain of raising the arms by causing the cords leading thereto to wind on the drums as the arms are raised, the tension of the springs being just strong enough to keep the said cords taut at all times. The cords are guided and held in their proper positions by the openings in the collar 4, and the convex edges of the openings prevent wear on the cords and permit them to run smoothly.

Having thus described my invention, what I claim, and desire to secure by Letters Patent, is—

1. A table-screen comprising a standard, a sleeve adjustably mounted thereon, brackets having notched upper edges radiating from the sleeve, arms pivoted to the said brackets, pawls carried by the said arms and engaging the notched edges of the brackets, and a canopy secured to the standard and the said arms.

2. A table-screen comprising a hollow standard, a collar on the upper end of said standard provided with radial openings, a sleeve adjustably mounted on the standard, foldable arms carried by the sleeve, a series of cords secured to the outer ends of said arms and passing therefrom to the collar and through the openings therein into the standard, flexible connections between the ends of the foldable arms, and a screen secured to the standard and supported by said flexible connections, the arms and the series of cords.

In testimony whereof I have signed this specification in the presence of two subscribing witnesses.

JOSEPH C. PATTERSON.

Witnesses:
SANDERS E. CLAY,
ADDISON Y. CLAY.